Patented Feb. 6, 1951

2,540,682

UNITED STATES PATENT OFFICE 2,540,682

STABILIZATION OF ESTERS OF NITROMALONIC ACID

Douglas A. Lyttle and David I. Weisblat, Kalamazoo, Mich., assignors to The Upjohn Company, Kalamazoo, Mich., a corporation of Michigan No Drawing. Application April 30, 1948, Serial No. 24,415

12 Claims. (Cl. 260—485)

This invention relates to a method for the stabilization of esters of nitromalonic acid and to stable compositions produced thereby.

Esters of nitromalonic acid have been found to be of great value in the preparation of amino acids as is disclosed in our copending application Serial 777,584, filed October 24, 1947, now Patent No. 2,528,928. For example, tryptophane may be prepared from an ester of nitromalonic acid by the following series of reactions:

Gramine+nitromalonate→alpha - (3 - methylindole) - alpha - nitro - malonate→alpha - nitrobeta - (3-indole) -propionate→alpha-amino-beta-(3-indole)-propionate→alpha - amino - beta-(3-indole)-propionic acid (tryptophane).

The preparation of certain esters of nitromalonic acid has been described (J. Chem Soc. 1935, 1). Others are disclosed in our copending application to which reference has been made. When prepared and purified by the procedures therein reported, the resulting ester always contains, as an impurity, varying quantities of oxides of nitrogen. Vigorous washing with water in acid solution, treatment with alkali, and distillation are necessary to remove these oxides. The ester when so purified is suitable for use in the synthesis as outlined above.

However, if an ester of nitromalonic acid which is free from oxides of nitrogen and therefore suitable for use in syntheses is allowed to stand, either in a closed container or open to the atmosphere, for any considerable period of time, e. g., ten to thirty days after purification, oxides of nitrogen resulting from the decomposition of the ester accumulate to such an extent that the ester becomes unsuited for use without further purification. This accmulation of oxides of nitrogen takes place regardless of which one of the methods known to the art for the purification of an ester of nitromalonic acid is used for the first purification thereof. The oxides of nitrogen resulting from this decomposition of an ester of nitromalonic acid act as a catalyst for further decomposition, so that the accumulation of oxides of nitrogen proceeds at a progressively increasing rate. This precludes their storage and shipment away from the point of manufacture to users who are at some distance from the site of manufacture, which in turn seriously affects the availability of esters of nitromalonic acid to those users who are not equipped for its immediate preparation. The lack of stability further increases the expense of the esters by requiring an additional purification before use, if the use is not promptly carried out after manufacture.

It is an object of this invention to provide a method for preventing the formation of oxides of nitrogen in esters of nitromalonic acid. It is an additional object of the invention to provide a method for the removal of oxides of nitrogen from esters of nitromalonic acid. It is a further object of this invention to stabilize esters of nitromalonic acid so that they may be stored for considerable periods of time at ordinary temperature without decomposition. Other objects of the invention will become apparent hereinafter.

The objects of this invention may be accomplished readily and rapidly by treating the ester of nitromalonic acid, which is desired to be stabilized, with an acid amide. The term "stabilize" as herein used, means to prevent such decomposition of an ester of nitromalonic acid which gives oxides of nitrogen as one product of the decomposition.

The method of the present invention may be carried out at any time during or after the isolation of the ester, as soon as most of the excess of nitric acid used for nitration, when nitration is employed in the previous step, has been removed. The stabilization may be accomplished in a number of ways. For example, the ester of nitromalonic acid, after removal of nitric acid, may be thoroughly mixed with an aqueous solution of the acid amide stabilizing agent. This mixing of the ester, or a water-immiscible solvent solution of the ester, with the acid amide may be done at any desired point in purification procedures known to the art, but preferably at least once before distillation of the product. The treatment may be carried out once or several times during the various purification steps as desired. When the treatment of this invention is employed, the step of distillation may be omitted as the product obtained is suitable for some chemical syntheses without distillation. Alternatively, the ester, after purification by known methods, may be treated by the direct addition of an amide. The quantity of the amide required to be added is small, usually less than five percent by weight of the nitromalonate, and, unless detrimental for the intended subsequent use, any excess present need not be removed. The amount usually left in admixture with the nitromalonate for best results and most effective stabilization is less than about one percent by weight of the nitromalonate. In any event, washing is continued until the oxides are completely removed as evidenced by a negative starch-potassium iodide paper test.

It appears that the decomposition of the esters which releases the oxides of nitrogen is catalyzed by their presence. Thus, the rate of decomposition becomes progressively greater with the passage of time and increase in the concentration of nitrogen oxides in the ester. Whether stabilization over long periods of time by the method of this invention results only from initial complete removal of the oxides, or whether the small amount of the amide stabilizing agent which is not removed during washing operations removes the oxides as rapidly as they are formed, thus preventing their autocatalytic effect, is not presently known. The invention is, however, not limited by the above possible explanation of a mechanism by which the stabilization is accomplished, as it is of importance only that stabilization does result.

Any selected acid amide may be used as stabilizing agent, whether unsubstituted or substituted on the amide nitrogen by a single alkyl, aryl, alkaryl or similar group. Such are primary or secondary, but not tertiary, amides.

Representative amides which may be used in the process of this invention are acetamide, propionamide, oxamide, succinamide, benzamide, urea, an N-monoalkylurea, malonamide, and others. Mono-substituted amides corresponding to the above unsubstituted amides are also suitable. Water-soluble amides are preferred in certain modifications of the method of this invention.

As far as the nitromalonic ester is concerned, this may be, for example, the dimethyl, diethyl, dipropyl, dibenzyl, diisopropyl, monoethylmonopropyl or other ester of nitromalonic acid, or a substituted nitromalonic ester, such as alpha-alkyl, alpha-aralkyl, or alpha-(3-methylindole)-malonic acid and the like.

A preferred procedure for the stabilization of an ester of nitromalonic acid is as follows: The ester, or a solution of the ester in an inert water-immiscible solvent such as chloroform, ether, or benzene, is thoroughly mixed with a dilute aqueous or other solution of the amide, preferably urea or acetamide. The mixture is then allowed to stand until two distinct layers are formed. The ester layer is separated, solvent removed, and the ester of nitromalonic acid distilled if desired. Should the ester be distilled, it is preferable either to repeat the mixing with the amide or to dissolve a small quantity of amide in the ester. When it is not necessary for the nitromalonic acid ester to be substantially colorless, the distillation step may be omitted. Other modifications of the method of mixing the amide and ester of nitromalonic acid within the skill of the art may be used and will be found satisfactory.

The following examples are illustrative of the invention but are not to be construed as limiting.

*Example 1*

To nine hundred grams of diethyl malonate, cooled to zero degrees centigrade and protected from atmospheric moisture, there was added with stirring 2200 milliliters of fuming nitric acid (sp. gr. 1.5) over a period of two and one-quarter hours. The temperature of the reaction mixture was maintained at zero degrees centigrade for an additional half hour, allowed to warm to 30 degrees centigrade during an hour, and then cooled to zero for an additional two and one-quarter hours. The cold reaction mixture was poured into three gallons of ice and water. The crude diethyl nitromalonate was extracted with three separate portions of chloroform and the chloroform extract washed twice with cold water. The nitro ester was extracted from the chloroform with ten percent sodium carbonate, and the resulting water solution of the sodium salt of diethyl nitromalonate extracted twice with three-liter portions of chloroform. The aqueous solution was cooled with ice and acidified by the slow addition of hydrochloric acid. Three extractions, using two liters of chloroform for each extraction, separated the diethyl nitromalonate from the water solution. The chloroform solution was dried over anhydrous magnesium sulfate, chloroform removed, and the residue fractionally distilled. There was thus obtained 893.4 grams of diethyl nitromalonate distilling at 78–80 degrees centigrade at a pressure of 0.35 millimeter of mercury.

The product still contained oxides of nitrogen as shown by its odor and greenish color. Starch-potassium iodide paper gave a purple color when a drop of the product was placed on the moist paper.

*Example 2*

Ten grams of the product from Example 1 was placed in a test tube and allowed to stand exposed to the air at room temperature. At the end of 30 days, the accumulation of oxides of nitrogen was so great that an attempted synthesis of tryptophane using this material was not entirely successful from several standpoints.

*Example 3*

Ten grams of diethyl nitromalonate from Example 1 was shaken with 4 milliliters of one percent solution of urea in water. The layers were separated and the ester layer dried over anhydrous magnesium sulfate. The color and odor had disappeared and the starch-potassium iodide test was negative. The ester was unchanged and free of oxides of nitrogen after three months standing in an open test tube, there being no odor and the starch-potassium iodide test being negative.

*Example 4*

Ten grams of diethyl nitromalonate from Example 1 was dissolved in an equal quantity of benzene. The benzene solution was shaken with about 5 milliliters of one percent solution of urea in water. The water layer was separated, the benzene solution dried, and benzene removed. The residual diethyl nitromalonate was free of oxides of nitrogen as shown by a negative starch-potassium iodide test. The ester was unchanged after three months standing in an open test tube, and the starch-potassium iodide test for oxides of nitrogen was negative.

*Example 5*

One kilogram of diethyl malonate was nitrated with fuming nitric acid (sp. gr. 1.5) as in Example 1. The reaction mixture was diluted with 3.5 gallons of ice water and the ester extracted using benzene as the solvent. The benzene solution was washed twice with water and once with three liters of a one-percent solution of urea in water. After this wash, a starch-potassium iodide paper test of the benzene solution was negative. The diethyl nitromalonate was extracted from the benzene with 10 percent aqueous solution of sodium carbonate, the sodium carbonate solution extracted with benzene, and then slowly acidified with hydrochloric acid. The acidified solution was extracted with benzene, and the benzene solution washed twice with water and once with three liters of a one-percent solution of urea in water. The benzene solution was dried and the benzene removed. The residual diethyl nitromalonate was slightly yellow but completely free of oxides of nitrogen as shown by the absence of green color, odor, and a negative starch-potassium iodide paper test. After standing one month at room temperature, no decomposition had occurred as shown by a negative starch-potassium iodide paper test.

Example 6

Five grams of diethyl nitromalonate containing oxides of nitrogen as shown by color, odor, and a positive starch-potassium iodide paper test was shaken with ten milliliters of a five percent solution of acetamide in water. The starch potassium iodide test was still positive. The mixture was then allowed to stand for four hours with occasional shaking after which time the starch-potassium iodide paper test was negative. The layers were separated, the ester dried over anhydrous magnesium sulfate, magnesium sulfate removed by centrifugation, and the clear light yellow ester allowed to stand in an open test tube at room temperature. After thirty days there was no evidence of evolution of oxides of nitrogen.

In a manner similar to that of the above examples, other esters of nitromalonic acid may be treated to remove oxides of nitrogen. When so removed the esters show no signs of decomposition upon standing at room temperature, either in closed containers or when exposed to the atmosphere. Among specific esters which may be so stabilized are dimethyl nitromalonate, diphenyl nitromalonate, dibenzyl nitromalonate, dihexyl nitromalonate, corresponding esters of substituted nitromalonates, and the like.

It is to be understood that this invention is not to be limited to the exact methods and compositions hereinbefore described, since obvious modifications will occur to a person skilled in the art from a study of the foregoing.

We claim:

1. A stabilized composition comprising an ester of nitromalonic acid and a quantity of an acid amide selected from the group consisting of primary and secondary carboxylic acid amides sufficient to stabilize said ester of nitromalonic acid against decomposition to oxides of nitrogen.

2. A stabilized composition comprising an ester of nitromalonic acid and a quantity of an acid amide selected from the group consisting of primary and secondary carboxylic acid amides sufficient to stabilize said ester of nitromalonic acid against decomposition to oxides of nitrogen, said composition giving a negative test to starch-potassium iodide paper.

3. A stabilized composition comprising a dialkyl ester of nitromalonic acid and a sufficient quantity of an amide selected from the group consisting of primary and secondary carboxylic acid amides to stabilize said dialkyl nitromalonate against decomposition to oxides of nitrogen.

4. A stabilized composition comprising a diethyl nitromalonate and a sufficient quantity of an amide selected from the group consisting of primary and secondary carboxylic acid amides to stabilize said diethyl nitromalonate against decomposition to oxides of nitrogen.

5. A stabilized composition comprising diethyl nitromalonate and a sufficient quantity of an amide selected from the group consisting of primary and secondary carboxylic acid amides to stabilize said diethyl nitromalonate against decomposition to oxides of nitrogen, said composition giving a negative test to starch-potassium iodide paper.

6. A product as in claim 5 wherein the amide is acetamide.

7. A product as in claim 5 wherein the amide is urea.

8. The process comprising mixing an ester of nitromalonic acid with a solution of an acid amide selected from the group consisting of primary and secondary carboxylic acid amides and separating products resulting from the mixture including a stabilized nitromalonate.

9. The process including the step of mixing a nitromalonic acid ester with an aqueous solution of an amide selected from the group consisting of primary and secondary carboxylic acid amides and recovering the stabilized nitromalonic ester.

10. The process comprising mixing a water-immiscible solvent solution of an alkyl nitromalonate with an aqueous solution of an amide selected from the group consisting of primary and secondary carboxylic acid amides and recovering the stabilized nitromalonic acid ester.

11. A process comprising mixing a benzene solution of diethyl nitromalonate and a water solution of urea, separating the solutions, and recovering stabilized diethyl nitromalonate.

12. A method for the stabilization of esters of nitromalonic acid including mixing therewith of a soluton of an acid amide selected from the group consisting of primary and secondary carboxylic acid amides and removing the amide, the amount of amide added being sufficient to accomplish substantially complete removal of dissolved oxides of nitrogen therefrom so that a starch-potassium iodide test paper will give a negative test when placed in contact with said ester.

DOUGLAS A. LYTTLE.
DAVID I. WEISBLAT.

No references cited.